Patented July 15, 1952

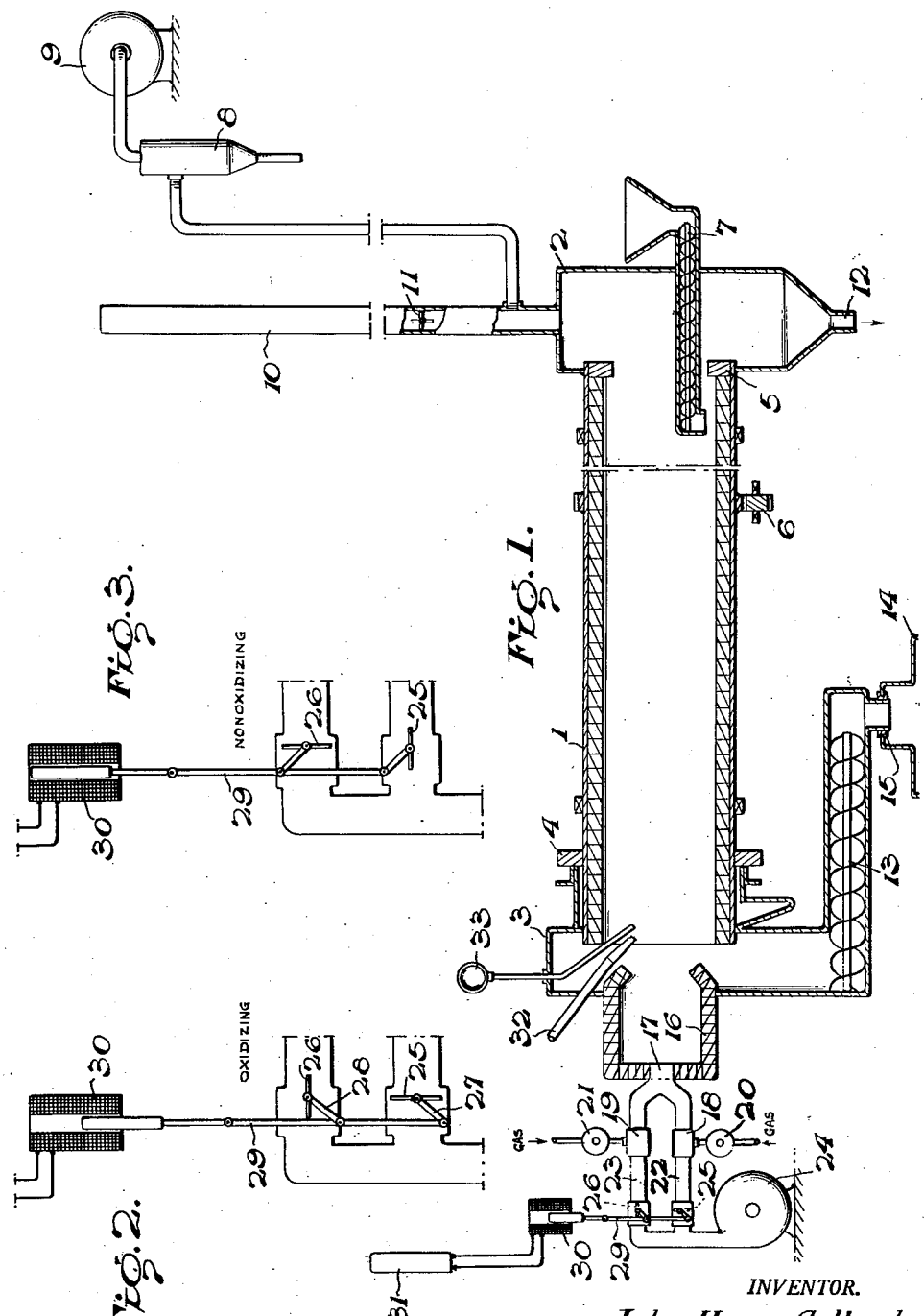

2,603,554

UNITED STATES PATENT OFFICE 2,603,554

PRODUCTION OF ZINC OXIDE

John Henry Calbeck, Columbus, Ohio, assignor to American Zinc, Lead & Smelting Company, St. Louis, Mo., a corporation of Maine Application June 1, 1948, Serial No. 30,413

11 Claims. (Cl. 23—147)

This invention relates to the calcination of zinc carbonate to produce zinc oxide particularly suitable for industrial applications such as rubber compounding that require an oxide of high chemical purity, uniform small particle size, and good white color. It will be understood, however, that the zinc oxide produced according to the present invention can be used for any other purpose desired.

Commercial zinc oxide is produced by oxidizing zinc vapors obtained by the volatilization of zinc. When zinc metal is volatilized for this purpose, zinc oxide of good quality is produced which is known commercially as French process zinc oxide and requires no further treatment. Of greater commercial importance, however, is the zinc oxide known as American process zinc oxide which is produced by burning zinc ores with carbonaceous fuel, the zinc content of the ore being thus reduced to zinc vapors that are oxidized with air in a suitable combustion chamber. The American process zinc oxide so produced usually contains impurities from the ore such as cadmium, lead, arsenic and the like, the kind and amount of such impurities depending on the character of the ore. Such impurities are not objectionable for many purposes, but if oxide of high quality is required such American process zinc oxide must be reheated and refined to improve color and remove objectionable impurities, especially sulfur compounds. Also the reheating and refining operations must be carried out in such a way as to avoid densification or growth in particle size of the oxide. My prior Patent No. 2,416,044 discloses and claims a refining process which accomplishes these results.

Zinc oxide can also be produced by calcination of zinc carbonates, thus decomposing the carbonate with liberation of carbon dioxide and producing zinc oxide. However, this method has had little if any commercial importance because of serious difficulties and disadvantages. In the case of mineral zinc carbonate, the ore is hard and difficult to crush and pulverize, and in conventional calcining operations the zinc oxide produced by calcination is mixed with unconverted zinc carbonate and with the gangue of the ore and must be separated and recovered by subsequent treatment. It has been proposed to inject the pulverized ore into a high velocity stream of gas to carry away the zinc oxide particles in suspension as they are formed (see for example Hughes Patent No. 920,337), but this method involves undesirable technical difficulties in maintaining the required gas velocity and further is inefficient because the larger particles of the ore do not remain in suspension but fall out of the stream. In addition, the zinc oxide obtained by these methods often contains impurities from the ore and is of poor color so that it must be refined if high quality is required.

Zinc oxide can also be obtained by calcination of basic zinc carbonates such as are obtained by precipitation methods. In this case the starting material is in the form of a powder and is relatively pure, but the oxide produced by conventional calcination may still be poor in color and require refinement.

Moreover, the most important objection to zinc oxides obtained by calcination of either mineral or basic zinc carbonates as set forth above is that their particle size is entirely too large for many purposes. This is due mainly to the fact that densification and growth in particle size take place during calcination. The decomposition of zinc carbonate begins theoretically at 300° C., but conventional calcining operations require temperatures of 700–900° C. to be maintained for periods of an hour or more if the decomposition and production of zinc oxide are to be carried to substantial completion. The calcination of either mineral carbonates or basic carbonates under these conditions results in oxides of such large particle size that they are not of pigment quality.

One of the principal objects of the present invention is to produce zinc oxide of extremely fine and uniform particle size by calcination of basic zinc carbonate.

Another object is to heat or calcine the basic zinc carbonate under conditions such that practically complete conversion to zinc oxide is obtained in much shorter periods and at much lower temperatures than those required in conventional calcination procedures.

A still further object is to calcine the basic zinc carbonate under conditions such that zinc oxide of excellent color is obtained.

Moreover, even precipitated basic zinc carbonates may contain objectionable volatile impurities such as cadmium unless carefully prepared, and in this event a still further object is to remove such objectional volatile impurities during the calcining operation.

By securing the foregoing objects as hereinafter set forth, the invention produces practically theoretical yields of zinc oxide of extremely fine particle size and of very high quality as the result of a simple, expeditious calcination.

The process of the present invention is applied to basic zinc carbonates such as are obtained by various known precipitation methods. These basic zinc carbonates (sometimes referred to as subcarbonates) contain various amounts of $H_2O$ and $CO_2$ which must be driven off when the product is calcined in order to produce zinc oxide. For example, this class of zinc compounds comprises trihydrated zinc trioxydicarbonate $$(2ZnCO_3 \cdot 3Zn(OH)_2)$$

and also the monohydrated monoxycarbonate $ZnCO_3 \cdot Zn(OH)_2$. When calcined, these compounds break down in the manner illustrated by the following equation:

$$ZnCO_3 \cdot Zn(OH)_2 = 2ZnO + H_2O + CO_2$$

The present invention produces zinc oxide of extremely fine particle size by calcining such basic zinc carbonates under conditions such that very fine particles of zinc oxide are produced initially as the zinc carbonate decomposes and such that growth of these particles or densification of the zinc oxide is substantially prevented. Although the basic zinc carbonate is in the form of a powder, its particles frequently are substantially larger than those of commercial French and American process zinc oxides and a zinc oxide of corresponding particle size would not be of pigment quality. In the present process, however, I have observed that the decomposition of the zinc carbonate is accompanied by breaking up of the particles in the nature of decrepitation. The particles of zinc oxide initially produced in this way are much smaller than those of commercial French and American process zinc oxides, being in fact submicroscopic in size. The present process also retains the initial small size of these zinc oxide particles for the most part, with the result that the zinc oxide produced has an average particle size not greater than 0.10 to 0.15 micron. Much of this oxide consists of still smaller submicroscopic particles. A minor proportion of larger particles may be noted ranging up to about 0.25 micron. These conditions as to particle size may be contrasted with commercial zinc oxides of pigment quality such as French process zinc oxides in which the average particle size is at least 0.15–0.18 micron and American process zinc oxide in which the average particle size is 0.20 micron or greater.

It is well known that there is considerable controversy at present among those skilled in the art with regard to the method to be used for the measurement of the particle size of zinc oxide and similar pigments. Hence the above numerical values of particle size of the product of the present invention and of typical French process and American process zinc oxides should be understood to be comparative and, of course, to have been determined by properly comparative methods of measurement. References to particle size in the appended claims are to be understood in the same sense.

The small particle size of the product of the present invention is of great importance in rubber compounding, since it results in much greater activation in vulcanization and increased tensile strength. For example, approximately the same degree of activation and approximately the same tensile strength can be obtained with only two-thirds as much of the new product as of commercial French and American process zinc oxides of good quality. The new product also has the important advantage that it is free-flowing and can be handled and fed mechanically without the compacting, caking and sticking generally encountered with zinc oxides as heretofore produced. Another advantage of the new product is that when compounded in rubber, the rubber holds its gages to an extent not obtainable when other zinc oxides are used. In other words, unvulcanized rubber so compounded may be extruded at lower temperatures and the product so produced does not shrink or otherwise change dimensions prior to vulcanization.

In order to obtain a product having the above quality and characteristics, I have found it necessary to avoid the long exposure of the calcine to high temperature under oxidizing conditions which is the case in conventional calcining operations as stated above. At the same time the decomposition of the zinc carbonate must be carried substantially to completion in the interest of economy and efficiency of operation. I have found that these results can be accomplished if the water vapor and the carbon dioxide liberated during decomposition are removed rapidly from the surface of the calcine as they are formed by a circulating non-oxidizing atmosphere. To facilitate this operation, the calcine should be distributed in a thin bed and preferably stirred or raked, or it may be agitated or overturned more or less continuously as by means of a rotary kiln of the type described hereinafter. The minimum velocity of the circulating gases should be about 50 feet per minute for effective removal of the $H_2O$ and $CO_2$. As the velocity is increased above this minimum the tendency to carry away zinc oxide and/or zinc carbonate dust in the circulating gases is also increased, and above about 200 feet per minute the loss due to such dusting may become excessive without any material improvement in the calcining operation.

Such circulation of gases greatly expedites the decomposition of the basic zinc carbonate. Temperatures of the order of 700° C. and above are still necessary, practically speaking, in order to facilitate the complete conversion of the basic zinc carbonate to zinc oxide, but such complete conversion can be effected in as little as 15–30 minutes. If the oxide produced is protected by a non-oxidizing atmosphere during a substantial part of this period, it can be exposed to such temperatures up to 1000° C. without substantial densification. The temperature of the charge increases rapidly, reaching a desired maximum of the order of 700° C.–1000° C. at the end of the short calcining operation. Under these conditions the basic zinc carbonate decomposes very quickly with decrepitation as explained above and densification is practically prevented, the basic zinc carbonate being completely converted in a very short time into the product described above.

The use of temperatures in excess of 600° C. also facilitates removal and recovery of any volatile impurities that may be present, particularly cadmium. Such impurities may be removed in the preparation of the basic zinc carbonate for calcination if desired. However, any cadmium remaining in the calcine will be volatilized at the higher temperatures and the cadmium vapors will be carried away in the stream of circulating gases. For such purposes the composition of the circulating gases should be reducing in character, containing not less than 10% combined CO and $H_2$. The desired composition of the atmosphere, whether non-oxidizing or reducing, can be provided by regulating the composition of the circulating gases in any suitable way. The atmosphere should also be clean, i. e., free of soot and solid carbon that might contaminate the calcine.

If the zinc oxide is chemically pure or substantially so, it can be held at high temperature in a non-oxidizing atmosphere for relatively long periods such as two hours or more without substantial densification and with little if any deterioration in color, although there is no advantage in continuing the heating beyond the point at which conversion of carbonate to oxide is complete. If on the other hand impurities such as cadmium are present even in small amounts, then such prolonged heating of the calcine even in a non-oxidizing (or reducing) atmosphere will result in discoloration of the oxide. Moreover, if such impurities are present discoloration of the oxide may occur within the period of calcination required to effect complete conversion although this period may be as short as 15–30 minutes. In case of any such discoloration it is desirable to expose the hot oxide to an oxidizing atmosphere for color improvement. This may be done after conversion has been completed in the non-oxidizing atmosphere, or simply by changing the composition of the circulating atmosphere during the calcination period required to effect complete conversion while maintaining the same velocity of circulation. However, the use of such an oxidizing atmosphere at high temperature, if unduly prolonged, will result in densification and accordingly the non-oxidizing atmosphere must be maintained throughout a substantial part of the conversion period which as a rule should not be less than 50%. Under these conditions complete conversion can be obtained in a short time without densification and with good color.

As stated above the decomposition of the basic zinc carbonate to zinc oxide begins theoretically at about 300° C. and temperatures below this value are of no benefit aside from preheating the carbonate. Higher temperatures in the range 700–1000° C. are beneficial for reasons explained above, but at the same time the above mentioned undesirable effects such as change in color due to impurities and densification in an oxidizing atmosphere are accelerated as the temperature increases. Accordingly the temperature of the oxide should not be permitted to increase substantially above 1000° C.

On the other hand, as the final oxide temperature is decreased conversion of the carbonate to oxide is retarded and more time is required to obtain complete conversion. Also the color of the oxide produced at final temperatures around 700° C. or less is apt to be dull instead of bright. Further if cadmium is present, its recovery is facilitated at temperatures above 700° C. The optimum final temperature will vary between 700° C. and 1000° C. depending on the relative importance of the above factors.

The foregoing operations can be carried out in any suitable apparatus capable of maintaining the required temperature conditions and circulation of gases over the calcine, and of varying the composition of the atmosphere over the calcine where this is desired. The composition of the circulating gases can be adjusted in any suitable way to provide non-oxidizing or reducing conditions and also oxidizing conditions when desired. The heat of calcination may be provided independently of the circulating gases in any conventional manner, but preferably these gases will at least be preheated to the temperature of the calcine. On the other hand, the circulating gases themselves may provide part or all of the heat of calcination. I prefer to provide the heat of calcination and the proper velocity and composition of the atmosphere by passing the gases of combustion of the heating fuel directly over the calcine and controlling the conditions of combustion of the fuel and particularly the ratio of air to fuel so as to adjust the composition of the gases. For example, I may provide a non-oxidizing atmosphere by burning natural gas with a slight deficiency of air, and oxidizing conditions by operating the burner with a substantial excess of air, say 40% or more. Flames of similar composition can be obtained by the controlled combustion of other fuels such as butane, propane, producer or water gas, etc.

When oxidizing conditions are to be maintained during the conversion period as explained above, the change in composition of the circulating gases can be accomplished simply and if desired automatically by adjusting the amount of air supplied to the burner at the proper time to provide the desired ratio of oxidizing time to non-oxidizing time. If desired the composition of the gases can be alternated periodically during the conversion period by timed periodic adjustment of the amount of air supplied to the burner, a procedure which is especially convenient in continuous processes of the type described hereinafter. The temperature and time of retention of the charge in the reaction zone will determine whether one or more alternations are required.

If desired the calcination may be carried out in two separate furnaces used in tandem. For instance, it may be desirable for color improvement to subject the oxide to a final flash oxidation of short duration in a second furnace having an oxidizing atmosphere. However, good results can be obtained by performing the complete calcination in a single furnace. For example a muffle type furnace can be used in which circulating gases of the desired composition are passed over the charge at the required velocity. It is convenient in practice to pass the calcine continuously through a kiln or the like in which the temperature progressively increases until the calcine is discharged at the desired final temperature. In such cases the heat of calcination may be provided by passing the gases of combustion through the kiln in a direction opposite to the direction of movement of the calcine.

By way of example, the calcination may be carried out in a gas fired rotary kiln of the type described in my prior patent mentioned above. Such kilns are commonly used for calcining materials by direct contact with the gases of combustion, and may be approximately 70 feet long and 5 feet inside diameter with air seals at both ends to prevent accidental or casual admission of air. The basic zinc carbonate is admitted at the high end of the rotating kiln and the charge travels to the low end where the zinc oxide is discharged into a suitable receptacle. The charge moves countercurrent to the gases of combustion from a burner at the low or discharge end of the kiln, the composition of these gases being regulated by controlling the amount of air supplied to the burner. Usually it will be desirable to alternate the composition of the gases from non-oxidizing to oxidizing conditions in order to take into account possible discoloration of the oxide, even though this may not always occur.

The accompanying drawings show an apparatus of the above type,

Fig. 1 being a side view of said apparatus; and

Figs. 2 and 3 being enlarged detail views of means for controlling the composition of the combustion gases.

Referring to Fig. 1, a brick-lined rotary kiln 1 is closed at its ends by bonnets 2 and 3 and air seals 4 and 5. A drive pinion for rotating the kiln is shown at 6. The basic zinc carbonate is introduced into the high end of the kiln by a feed conveyor 7. Dust and fumes escaping from this end may be drawn into a dust collector 8 by means of a fan 9 or may escape through a flue 10 when the flue valve 11 is opened. Any dust falling out of the fumes is discharged from an opening 12 in the bottom of the bonnet 2. The zinc carbonate is converted during its passage down the kiln to zinc oxide which is discharged at the low end of the kiln through a discharge conveyor 13 into a receptacle 14 air-sealed to the conveyor mouth at 15.

A combustion chamber 16 extends through the bonnet 3 and opens into the low end of the kiln to supply thereto heating gases provided by the products of combustion from a burner 17. Gaseous fuel for the burner is delivered to mixers 18 and 19 at low pressure through regulators 20 and 21 respectively, and air is supplied to the mixers by means of pipes 22 and 23 and a blower 24. One mixer is adjusted to provide a non-oxidizing or reducing flame and the other an oxidizing flame at the burner, and the mixers are operated alternately by means of air supply valves 25 and 26. These valves are preferably arranged for automatic operation at timed intervals, one valve being opened when the other is closed. As shown, this is accomplished by valve-actuating links 27 and 28 (Figs. 2 and 3) connected to a rod 29 that is moved by a solenoid 30 controlled by a time switch 31.

The gases of combustion pass directly from the combustion chamber into the discharge end of the kiln. If the heat requirement is too low to provide the required gas velocity through the kiln, steam or inert gas is introduced into the furnace through the inlet 32. For example a fraction of the spent combustion gases may be recirculated from the dust collector 8.

As the gases of combustion pass through the kiln, their temperature progressively decreases and hence their volume also decreases and their velocity is progressively reduced. The changes in temperature and velocity of the gases in passing through the kiln will depend on its length and diameter. In a kiln of the size mentioned above, the temperature of the gases as they enter the discharge end of the kiln may be about 950° C., as observed by means of a pyrometer 33 or the like, and their velocity may be about 200 feet per minute. Then at the midpoint of the kiln the temperature will be about 650° C. and the velocity about 150 feet per minute. At the other end of the kiln the temperature will be approximately 300° C., the minimum temperature for decomposition of the basic zinc carbonate, and the velocity will be about 50 feet per minute, the minimum velocity for effective removal of $H_2O$ and $CO_2$ released by decomposition.

Under these conditions, the time of retention of the charge in the kiln should be about 15-30 minutes. The temperature of the charge rapidly increases in the first part of the kiln to the point where decomposition begins and although the total time required for the charge to travel through the kiln is only a few minutes, yet it will be substantially completely decomposed and converted to zinc oxide due to the sweeping away of $H_2O$ and $CO_2$ by the gaseous current as explained above. The oxide may reach a maximum temperature of 900° C. just before it is discharged from the kiln.

In the latter part of the kiln where the temperature of the charge rises to 700° C. and above, any cadmium that may be present will be volatilized and swept away by the circulating gases. To protect the color of the oxide against change toward yellow at these higher temperatures, the operation of the air valves 25 and 26 may be timed so as to provide, for example, non-oxidizing conditions for six minute periods alternated with four minute periods of oxidizing conditions. Under the stated conditions of operation, this cycle will usually be about right to provide good color with practically no densification. However, it will be understood that the cycle can be either lengthened or shortened and that the ratio of oxidizing to non-oxidizing time can be either increased or decreased according to varying conditions of operation.

Further it should be noted that if densification is desired, it may be secured by increasing sufficiently the ratio of oxidizing time to non-oxidizing time.

The invention is not restricted to the particular details set forth above by way of example, and reference should be had to the appended claims for a definition of its limits. It will be understood that the term "non-oxidizing" used in these claims includes atmospheres that are also reducing in character, since a reducing composition is preferred in certain cases as explained above and may be provided in all cases if desired.

What is claimed is:

1. A process of producing zinc oxide which comprises calcining precipitated basic zinc carbonate to cause its decomposition to zinc oxide with liberation of water vapor and carbon dioxide while substantially immediately removing said carbon dioxide and water vapor by heating said carbonate with agitation in an atmosphere moving at a velocity between 50 and 200 feet per minute and at a maximum temperature between 700° C. and 1000° C. until the conversion of the basic zinc carbonate to zinc oxide is substantially complete, and maintaining a non-oxidizing composition of said atmosphere during at least 50% of the conversion period, thereby producing zinc oxide having an average particle size of about 0.10 to 0.15 micron.

2. The process defined in claim 1 wherein said non-oxidizing composition of the atmosphere includes not less than 10% combined hydrogen and carbon monoxide to effect the removal of cadmium from the product during the conversion.

3. The process defined in claim 1 wherein the zinc oxide produced is exposed to an oxidizing atmosphere for color improvement.

4. The process defined in claim 1 wherein the composition of said moving atmosphere is changed to an oxidizing composition during the conversion period for color improvement.

5. A continuous process of producing zinc oxide which comprises calcining precipitated basic zinc carbonate to cause its decomposition to zinc oxide with liberation of water vapor and carbon dioxide by heating said carbonate with agitation at a maximum temperature between 700° C. and 1000° C., the time of retention of the charge being sufficient to effect substantially complete conversion of the basic zinc carbonate to zinc oxide, while removing said carbon dioxide and water vapor as they are liberated by passing a non-oxidizing atmosphere over the calcine at a velocity between 50 and 200 feet per minute, maintaining said non-oxidizing composition during at least 50% of the conversion period and changing the composition of said atmosphere from non-oxidizing to oxidizing at least once before the completion of calcination, thereby producing zinc oxide of good color with an average particle size of about 0.10 to 0.15 micron.

6. A continuous process of producing zinc oxide which comprises passing precipitated basic zinc carbonate with agitation through a heating zone countercurrently to the flow of non-oxidizing gases free of soot and solid carbon, the temperature of the charge being raised to a maximum between 700° C. and 1000° C. during its passage through said zone and the time of retention of the charge being sufficient to effect substantially complete conversion of the basic zinc carbonate to zinc oxide with liberation of carbon dioxide and water vapor, while removing said carbon dioxide and water vapor as they are formed by passing said gases over the charge in the temperature range from 300° C. up to said maximum at a velocity between 50 and 200 feet per minute, and maintaining the non-oxidizing composition of said gases during at least 50% of the conversion period, thereby producing zinc oxide having an average particle size of about 0.10 to 0.15 micron.

7. The process defined in claim 6 wherein said non-oxidizing gases contain not less than 10% by volume of carbon monoxide and hydrogen in order to effect removal of cadmium from the product during the conversion.

8. A process as defined in claim 6 wherein the composition of said gases is changed to an oxidizing composition at least once during the passage of the charge through said zone to improve the color and the zinc oxide.

9. A process as defined in claim 6 wherein the speed of travel of the charge through said zone is regulated to provide a period of retention therein of about 15-30 minutes.

10. A process as defined in claim 6 wherein the composition of said gases is periodically alternated from non-oxidizing to oxidizing and vice versa, the length of the alternation cycle and the ratio of oxidizing time to non-oxidizing time being proportioned to the speed of travel of the charge through said zone so that all parts of the charge are exposed to non-oxidizing conditions during at least 50% of their retention in said zone and at least once to oxidizing conditions during their retention in said zone.

11. A process of producing finely divided zinc oxide which comprises heating precipitated basic zinc carbonate with agitation to a maximum temperature between 700° C. and 1000° C. in an atmosphere moving at a velocity between 50 and 100 feet per minute, said carbonate thereby decomposing to zinc oxide with liberation and substantially immediate removal of carbon dioxide and water vapor, while maintaining a non-oxidizing composition of said atmosphere during at least 50% of the period of decomposition.

JOHN HENRY CALBECK.

REFERENCES CITED

The following references are of record in the file of this patent:

UNITED STATES PATENTS

| Number | Name | Date |
| --- | --- | --- |
| 108,433 | Bartlett | Oct. 18, 1870 |
| 1,445,366 | Stevenson | Feb. 13, 1923 |
| 1,522,097 | Breyer | Jan. 6, 1925 |
| 1,522,098 | Breyer | Jan. 6, 1925 |
| 1,566,103 | Kirk | Dec. 15, 1925 |
| 2,144,299 | Sessions | Jan. 17, 1939 |
| 2,200,873 | Cyr | May 14, 1940 |
| 2,348,883 | Cyr | May 16, 1944 |

FOREIGN PATENTS

| Number | Country | Date |
| --- | --- | --- |
| 500,686 | Great Britain | Feb. 14, 1939 |

OTHER REFERENCES

J. W. Mellor's "A Comprehensive Treatise on Inorganic and Theoretical Chemistry," vol. 4, pp. 645, 646, published by Longmans, Green & Co., N. Y.